(12) United States Patent
Rhee et al.

(10) Patent No.: US 8,597,775 B2
(45) Date of Patent: Dec. 3, 2013

(54) MICROPOROUS POLYOLEFIN MULTI LAYER FILM

(75) Inventors: Jang-Weon Rhee, Daejeon (KR); In Hwa Jung, Chungcheongnam-do (KR); Gwig Won Kang, Daejeon (KR); Young Keun Lee, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 197 days.

(21) Appl. No.: 12/995,471

(22) PCT Filed: May 29, 2009

(86) PCT No.: PCT/KR2009/002885
§ 371 (c)(1),
(2), (4) Date: Dec. 1, 2010

(87) PCT Pub. No.: WO2009/148239
PCT Pub. Date: Dec. 10, 2009

(65) Prior Publication Data
US 2011/0104468 A1    May 5, 2011

(30) Foreign Application Priority Data
Jun. 3, 2008    (KR) .................. 10-2008-0051989

(51) Int. Cl.
*B32B 7/02*    (2006.01)
(52) U.S. Cl.
USPC .......................................... 428/212; 428/220
(58) Field of Classification Search
USPC ...................... 428/212, 220, 411.1
See application file for complete search history.

(56) References Cited

U.S. PATENT DOCUMENTS

| | | | |
|---|---|---|---|
| 5,641,565 A | 6/1997 | Sogo | |
| 5,691,077 A | 11/1997 | Yu | |
| 6,949,315 B1 | 9/2005 | Samii et al. | |
| 8,003,204 B2 * | 8/2011 | Rhee et al. | 428/316.6 |
| 2008/0057388 A1 | 3/2008 | Kono et al. | |
| 2009/0098450 A1 * | 4/2009 | Kikuchi et al. | 429/145 |

FOREIGN PATENT DOCUMENTS

| | | |
|---|---|---|
| CN | 101164677 | 4/2008 |
| JP | 2002-321323 | 11/2002 |
| JP | 2006-038532 | 2/2006 |
| JP | 2007-088815 | 4/2007 |
| WO | 2004/089627 | 10/2004 |
| WO | 2006/038532 | 4/2006 |
| WO | 2007/034856 | 3/2007 |

* cited by examiner

*Primary Examiner* — Mark Ruthkosky
*Assistant Examiner* — Lawrence Ferguson
(74) *Attorney, Agent, or Firm* — Clark & Brody (57) ABSTRACT

A microporous polyolefin multilayer film which is used as a separator for a battery is a 3 layer microporous film which is prepared by a wet process to have both surface layers containing polyethylene of 95 wt % or more having a melting temperature of 125° C. or higher, and an inner layer containing polypropylene of 50 to 90 wt % having a melting temperature of 160° C. or higher and polyethylene of 10 to 50 wt % having a melting temperature of 125° C. or higher. A thickness of the film is 9-50/M, a puncture strength is 0.15N//M or more, a permeability is $1.5 \times 10^{-5}$ Darcy or more, a multiplication of the puncture strength and the permeability is $0.4 \times 10^{-5}$ Darcy·N/μm or more, a shrinkage in a transverse direction at 120° C. for 1 hour is 15% or less, and a melt fracture temperature of 160° C. or higher.

4 Claims, 1 Drawing Sheet

MICROPOROUS POLYOLEFIN MULTI LAYER FILM

TECHNICAL FIELD

The present invention relates to a microporous polyolefin multilayer film having excellent heat resistance, and more particularly, to a microporous polyolefin multilayer film which has a low shutdown temperature caused by polyethylene, a high melt fracture temperature caused by polypropylene, and also has excellent strength, quality stability and heat resistance.

BACKGROUND ART

A polyolefin-based microporous film has been widely used as a battery separator, a filter, and a membrane for microfiltration, due to its chemical stability and excellent physical properties.

Among methods to manufacture a microporous film from polyolefin, a wet process which makes a single phase melt by melt-mixing polyolefin with diluent at high temperature, phase-separates the polyolefin from the diluent during a cooling process and then forms pores by extracting the diluent is capable of preparing a thinner film and has excellent strength, permeability, uniform pores, and excellent quality stability, such that it has been widely used in a lithium ion secondary battery, etc.

Although the lithium ion secondary battery is an excellent battery having a very high energy density, it has danger of a fire or explosion when a short is generated, such that a separator used therein is greatly requested to have stability together with a high quality level. In accordance with the recent trend of high-capacity and high-power of the lithium ion secondary battery such as a battery for a hybrid vehicle, etc., there has been a greater demand for a thermal stability of the separator, in addition to the quality stability of the conventional wet product. This is the reason that if the thermal stability of the separator is deteriorated, the danger of explosion by the melt fracture of the separator according to over-heat of the battery is increased.

The thermal stability of the battery is determined depending on a high-temperature shrinkage, a shutdown temperature and a melt fracture temperature of the separator.

If the separator is excessively shrinked at a high temperature, a surface of electrodes are exposed. In this case, the possibility of the occurrence of such an electrical short is increased, and thus the thermal stability of the battery is seriously deteriorated.

The shutdown temperature is a temperature that micropores of the separator are shutdown to shut-off the current, when the inside temperature of the battery is abnormally increased due to the electrical short and the like. The melt fracture temperature is a temperature that the separator is melt-fractured to allow current to be flowed again, when the temperature of the battery is continuously increased over the shutdown temperature. For the stability of the battery, it is preferable that the shutdown temperature is low and the melt fracture temperature is high. In particular, the melt fracture temperature, which is a temperature that can continuously block current in a situation that the explosion of the battery may be caused, has the closest relation with the stability of the battery.

The efforts to improve the thermal stability of the separator have been made continuously.

U.S. Pat. No. 6,949,315 discloses a film that improves thermal stability of a separator by melt-mixing inorganic material such as 5-15 wt % titanium oxide to ultra-high molecular weight polyethylene. However, this method may easily cause problems that melt-mixing ability is deteriorated according to the adding of the inorganic material, and pin-holes are generated and quality becomes non-uniform according to the deterioration of the melt-mixing ability when being stretched, and may cause deterioration in the physical property of the film such as impact strength, etc., due to a lack of compatibility in the interface between the inorganic material and polymer resin, despite the improvement in the thermal stability in accordance with the addition of the inorganic material. The separator using inorganic material cannot but have the disadvantages as described above.

A separator that is prepared by melt-mixing resin having excellent heat resistance instead of inorganic material is disclosed in U.S. Pat. No. 5,641,565. This technique is to mix 30-75 wt % organic liquid-phase compound and 10-50 wt % inorganic material with a resin mixture where polyethylene is mixed with 5-45 wt % polypropylene and then to extract the organic liquid-phase compound and the inorganic material, thereby preparing a separation membrane. Although this technique extracts the inorganic material, it still has the problems at the time of melt-mixing as described above and further causes a problem that physical property is deteriorated due to the addition of polypropylene that does not have melt-mixing ability with polyethylene as mentioned in the patent itself. Also, this method is added with processes of extracting and removing the used inorganic material, thereby having a disadvantage that the process becomes complicated, and this method needs a relatively high amount of polyethylene in order to obtain a sufficient heat resistance, wherein the physical property of the separator is more deteriorated.

As a method to prepare a multilayer separator for improving the thermal stability of a separator, U.S. Pat. No. 5,691,077 discloses a method of making a 3 layer separator by laminating polypropylene having a high melt fracture temperature (having a high melting temperature) on polyethylene having excellent shutdown property (having a low melting temperature). Although this separator is excellent in view of thermal property, it has disadvantages of the non-uniform stretching, the generation of pin-holes, and the increase of thickness deviation, etc. during the preparation of a fabric film by a low temperature dry process, and also it has not only a deterioration problem in productivity due to the addition of the lamination process performed in a separate process but also a delamination problem due to the defect of the lamination, such that this separator has not been widely used. This method has problems that strength, permeability, quality uniformity, and productivity, which are indispensable for a separator of a secondary battery, are deteriorated, despite excellent heat resistance.

Japanese Patent Laid-Open Publication No. 2002-321323 discloses a microporous polyolefin multilayer film that a polyethylene film and a polyethylene/polypropylene compound film are laminated. However, since a polypropylene content of the polyethylene/polypropylene compound film is low, it is difficult to sufficiently increase the melt fracture temperature.

Japanese Patent Laid-Open No. 2007-088815 and PCT Publication No. WO2004-089627 disclose multilayer separators that have a microporous polyethylene film prepared using a wet process as a main layer and have a layer mixed with polyethylene and polypropylene prepared using a wet process as a surface layer. However, owing to its low crystallinity, when the polypropylene is used as a surface layer in the wetting process extruded with diluent, a lot of polypropylene wax remains in the diluent after being extruded and thus there is a problem that a film and a roll surface are polluted by the wax extracted during post-processings such as stretching/extrusion, etc, thereby deteriorating quality stability.

Furthermore, in these technologies, a shrinkage of film, which is one of the most important factors in the thermal stability, is left out of consideration.

PCT Publication No. 2006-038532 discloses a multilayer separator by wet process containing inorganic material. However, this separator also has a complicated melt-mixing process due to the melt-mixing of inorganic material. Also, if inorganic material is added into the surface layer, the inorganic material is separated during processes of stretching/extraction/winding/slitting, etc. so that it may cause pollution due to inorganic powder and scratch of other surface layers, thereby deteriorating quality stability.

The indispensable properties of a separator for a secondary battery are strength, permeability and quality uniformity, and in recent, there is a great demand for thermal stability additionally. However, the conventional techniques as described above have not accomplished the quality stability, the strength/permeability and a high thermal stability at the same time.

DISCLOSURE

Technical Problem

After having repeated broad studies in order to solve the problems of the prior arts as described above, the present inventors found that a 3 layer porous film having a separate internal layer formed of polypropylene and polyethylene and other porous films as both surface layers formed of polyethylene and treated by a heat-setting process may be a multilayer separator that simultaneously has property of a porous film containing polypropylene having excellent heat resistance and quality stability property of a microporous polyethylene film.

Therefore, an object of the present invention is to provide a microporous film for a secondary battery that has very excellent strength, permeability, thermal stability, and quality stability at the same time.

Technical Solution

To achieve the above objects, the present invention provides a method of preparing a microporous polyolefin multilayer film that is a 3 layer microporous film, including:

(a) melt-mixing a composition comprised of a diluent of 80-50 wt % and a resin mixture of 20-50 wt % containing polyethylene of 95 wt % or more having a melting temperature of 125° C. or higher;

(b) melt-mixing a composition comprised of a diluent of 80-50 wt % and a resin mixture of 20-50 wt % containing polypropylene of 50-90 wt % having a melting temperature of 160° C. or higher and polyethylene of 10-50 wt % having a melting temperature of 125° C. or higher;

(c) fabricating the melt in the melt-mixing the composition comprised of the diluent of 80-50 wt % and the resin mixture of 20-50 wt % containing polyethylene of 95 wt % or more having the melting temperature of 125° C. or higher and the melt-mixing the composition comprised of the diluent of 80-50 wt % and the resin mixture of 20-50 wt % containing polypropylene of 50-90 wt % having the melting temperature of 160° C. or higher and polyethylene of 10-50 wt % having the melting temperature of 125° C. or higher to be a 3 layer sheet, so that the melt in the melt-mixing the composition comprised of the diluent of 80-50 wt % and the resin mixture of 20-50 wt % containing polyethylene of 95 wt % or more having the melting temperature of 125° C. or higher is used to be fabricated to both surface layers and the melt in the melt-mixing the composition comprised of the diluent of 80-50 wt % and the resin mixture of 20-50 wt % containing polypropylene of 50-90 wt % having the melting temperature of 160° C. or higher and polyethylene of 10-50 wt % having the melting temperature of 125° C. or higher is used to be fabricated to an inner layer;

(d) stretching the 3 layer sheet to be a film;

(e) extracting the diluent from the film; and (f) heat-setting the film, wherein a thickness of the film is 9-50 μm, a puncture strength is 0.15N/μm or more, a permeability is $1.5 \times 10^{-5}$ Darcy or more, a multiplication of the puncture strength and the permeability is $0.4 \times 10^{-5}$ Darcy·N/μm or more, a shrinkage in a transverse direction at 120° C. for 1 hour is 15% or less, and a melt fracture temperature of 160° C. or higher.

The basic theory to prepare a microporous polyolefin multilayer film used in the present invention is as follows.

The wet process to prepare the microporous film from polyethylene uses a process which stretches a sheet from the fabrication of mixing and extruding polyethylene and diluent corresponding thereto in order to form a film and then extracts the diluent using an organic solvent. However, the separator prepared by using polyethylene has a limit in heat resistance, since the melting temperature of polyethylene cannot exceed 135° C. To the contrary, although the melting temperature of polypropylene can rise to 160° C. or more, it has a low crystallinity so that it is difficult to manufacture a film having a high permeability using the wet process. Furthermore, it has a high shutdown temperature due to the high melting temperature so that stability is deteriorated. (The shutdown temperature is a temperature that micropores of the separator are shutdown to shut-off the current when the inside temperature of the battery is abnormally increased, and thus it is preferable that the shutdown temperature is low).

One of methods to overcome the problem is to use polyethylene and polypropylene at the same time. However, since polyethylene and polypropylene are not compatible with each other, the physical property of the final microporous film is deteriorated upon the melt-mixing. In order to minimize the deterioration of the physical property and also maximize the properties of polyethylene and polypropylene, it is preferable to fabricate the multilayer microporous film which has separate layers formed of polyethylene and polypropylene so that the shutdown temperature is lowered by the polyethylene layer and the melt fracture temperature is increased by the polypropylene layer.

If polypropylene is used alone, it is difficult to fabricate the film having the high permeability. If polyethylene is mixed with the polypropylene layer, crystallinity of the polypropylene layer is increased and an interface between polyethylene and polypropylene is cracked during the stretching process, thereby increasing the permeability.

Further, due to the low crystallinity property of polypropylene, when the polypropylene is used as a surface layer in the wet process extruded with diluent, a lot of polypropylene wax remains in the diluent after being extruded and thus there is a problem that a film and a roll surface are polluted by the wax extraction during post-processings such as stretching/extraction, etc, thereby deteriorating quality stability. This problem can be solved by using the polypropylene layer as the inner layer of the 3 layer film.

One of reasons why the inside temperature of the battery is abnormally increased is the electrical short in the battery. The electrical short in the battery can be remarkably reduced by increasing the strength of the separator and reducing the high-temperature shrinkage. The strength of the separator may be controlled by the stretching process, and the shrinkage may be minimized by the heat-setting process.

Consequently, the multilayer microporous film prepared as described above can have a low shutdown temperature of polyethylene and a high melt fracture temperature of polypropylene at the same time, and also have the excellent physical property and quality stability.

Hereinafter, the respective processes for fabricating the microporous polyolefin multilayer film will be described in more detail.

(a) Melt-mixing a composition comprised of a diluent of 80-50 wt % and a resin mixture of 20-50 wt % containing polyethylene of 95 wt % or more having a melting temperature of 125° C. or higher, is performed.

The polyethylene used in the present invention has a melting temperature of 125° C. or higher, preferably 125° C. to 135° C., and may be a polyethylene homo-polymer, a polyethylene co-polymer copolymerized with ethylene and at least one of olefin comonomer having 3-8 carbon atoms, or a mixture of the homo-polymer and the copolymer or the copolymer and the copolymer. The olefin comonomer having 3-8 carbon atoms may include propylene, 1-butene, 1-hexene, 1-octene and 4-methylpentene-1 and the like.

It is preferable that the polyethylene has a weight average molecular weight of $2 \times 10^5$ to $3 \times 10^6$. When the weight average molecular weight is less $2 \times 10^5$, the physical property of the final porous film becomes weak, and when the weight average molecular weight is more than $3 \times 10^6$, extrusion is deteriorated so that productivity is decreased. The more preferable range of the weight average molecular weight is $2 \times 10^5$ to $1.5 \times 10^6$.

The diluent used in the present invention may use all of organic liquid compounds that form a single phase with resin at an extrusion processing temperature. For example, there are aliphatic such as nonane, decane, decalin, and paraffin oil, etc., or phthalic acid ester such as cyclic hydrocarbon, dibutyl phthalate, and dioctyl phthalate, etc. Preferably, paraffin oil that is harmless to human body and has a high boiling point and less volatile components is suitable, and more preferably, paraffin oil having kinetic viscosity of 20 cSt-200 cSt at 40° C. is suitable. If the kinetic viscosity of paraffin oil is above 200 cSt, it leads to a high kinetic viscosity during an extrusion process so that it may cause problems of increase in load and defects on a surface of a film and a sheet, etc., and it leads to difficulties in extraction during an extraction process so that it may cause problems of deterioration in productivity and reduction in permeability due to remaining oil, etc. If the kinetic viscosity of paraffin oil is below 20 cSt, it leads to mixing difficulties in extrusion processing due to viscosity difference with melted polyethylene in an extruder.

The resin compound used in the present invention contains polyethylene of 95 wt % or more having a melting temperature of 125° C. or higher, and most preferably polyethylene alone. Other resins like polymethylpentene may be added in the range not to affect the low shutdown temperature and the pore structure of polyethylene, and the content of other resins is preferably below 5 wt %. If the content is above 5 wt % (that is, if polyethylene below 95 wt %), the low shutdown temperature and the pore structure of polyethylene may be not provided, and also the physical property is remarkably reduced.

The preferable composition of the diluent and the resin mixture containing polyethylene of 95 wt % or more having a melting temperature of 125° C. or more used in the present invention is constituted by the resin mixture of 20-50 wt % and the diluent of 80-50 wt %. If the content of the resin mixture is above 50 wt % (that is, if the diluent is below 50 wt %), the porosity is reduced, the pore size becomes small and the interconnection between the pores is few so that the permeability is noticeably deteriorated.

To the contrary, if the content of the resin mixture is below 20 wt % (that is, if the diluent is above 80 wt %), the mixing ability of the resin mixture and the diluent is deteriorated so that the resin mixture is not thermodynamically mixed in the diluent but is extruded in a gel, thereby may cause problems of the breakage and the non-uniformity in thickness when stretching.

General additives for improving specific functions, such as antioxidant, UV stabilizer, and antistatic agents, etc., may be further added into the composition, as needed.

The composition is melt-mixed using a twin-screw compounder, a mixer, or a banbary mixer, etc. that is designed for mixing resin mixture and the diluent. The melt mixing temperature is preferably 180° C. to 300° C. The resin mixture and the diluent may be fed into the compounder by being previously blended or may be fed thereto from separated feeders, respectively.

(b) Melt-mixing a composition comprised of a diluent of 80-50 wt % and a resin mixture of 20-50 wt % containing polypropylene of 50-90 wt % having a melting temperature of 160° C. or higher and polyethylene of 10-50 wt % having a melting temperature of 125° C. or higher, is performed.

The polypropylene used in the present invention has a melting temperature of 160° C. or higher, preferably 160 to 180° C., and may be a polypropylene homo-polymer, a polypropylene co-polymer copolymerized with propylene and at least of ethylene and olefin having 4-8 carbon atoms, or a mixture of the homo-polymer and the copolymer or the copolymer and the copolymer. It is preferable that the polypropylene has a weight average molecular weight of $5 \times 10^4$ to $3 \times 10^6$. When the weight average molecular weight is below $5 \times 10^4$, the strength of the diluent and the resin mixture is weak and thus it is impossible to perform the stretching process, and when the weight average molecular weight is above $3 \times 10^6$, the mixing ability of diluent and polyethylene is deteriorated.

In the resin mixture of polypropylene and polyethylene, if the content of polypropylene is below 50 wt %, it is not possible to form a polypropylene matrix which is connected like a net of polypropylenes, and thus the melt fracture temperature is not remarkably increased. To the contrary, if the content of polypropylene is above 90 wt %, the permeability is considerably reduced due to the low crystallinity of polypropylene.

In the preferable composition of the diluent and the resin mixture of polypropylene and polyethylene, if the content of the resin mixture is above 50 wt %, the porosity of the final film is reduced, the pore size becomes small and the permeability is noticeably deteriorated. To the contrary, if the content of the resin mixture is below 20 wt %, the mixing ability of the resin mixture and the diluent is deteriorated so that the resin mixture is not thermodynamically mixed in the diluent but is extruded to a gel, thereby may cause problems of the breakage and the non-uniformity in thickness when stretching.

General additives for improving specific functions, such as antioxidant, UV stabilizer, and antistatic agents, etc., may be further added into the composition, as needed.

The composition is melt-mixed using a twin-screw compounder, a mixer, or a banbary mixer, etc. that is designed for mixing the polypropylene, polyethylene and the diluent. The melt-mixing temperature is preferably 180° C. to 300° C. The resin mixture and the diluent may be fed into the compounder by being previously blended or may be fed thereto from separated feeders, respectively.

(c) Fabricating the melt in the melt-mixing the composition comprised of the diluent of 80-50 wt % and the resin mixture of 20-50 wt % containing polyethylene of 95 wt % or more having the melting temperature of 125° C. or higher and the melt-mixing the composition comprised of the diluent of 80-20 wt % and the resin mixture of 20-50 wt % containing polypropylene of 50-90 wt % having the melting temperature of 160° C. or higher and polyethylene of 10-50 wt % having the melting temperature of 125° C. or higher to be a 3 layer sheet, so that the melt in the melt-mixing the composition comprised of the diluent of 80-50 wt % and the resin mixture of 20-50 wt % containing polyethylene of 95 wt % or more having the melting temperature of 125° C. or higher is used to be fabricated to both surface layers and the melt in the melt-mixing the composition comprised of the diluent of 80-50 wt % and the resin mixture 20-50 wt % containing polypropylene of 50-90 wt % having the melting temperature of 160° C. or higher and polyethylene of 10-50 wt % having the melting temperature of 125° C. or higher is used to be fabricated to an inner layer, is performed.

The method to prepare a sheet from the melt may use all of a general casting or a calendaring method. The temperature of the proper casting or calendering roll is 30° C. to 80° C. If the cooling roll is below 30° C., wrinkles of the sheet may occur due to the rapid cooling of the sheet, and if the cooling roll is above 80° C., surface defects, etc., may occur due to the insufficient cooling.

The method to manufacture the multilayer sheet may use a general co-extrusion method, a thermal bonding method or a coating method. The co-extrusion method is to fabricate a multilayer sheet by co-extruding melts from each extruder through a T-die with multi layers when fabricating the sheet, and the thermal bonding method is to overlap sheets obtained from each extruder and then thermally bond them, while applying pressure thereto, and the coating method is to fabricate a multilayer sheet by extruding a secondary sheet on a first sheet.

The multilayer sheet is constituted into a 3 layer sheet in which the sheet prepared in the melt-mixing the composition comprised of the diluent of 80-50 wt % and the resin mixture of 20-50 wt % containing polyethylene of 95 wt % or more having the melting temperature of 125° C. or higher is used as both surface layers, and the sheet in the melt-mixing of the composition comprised of the diluent of 80-50 wt % and the resin mixture of 20-50 wt % containing polypropylene of 50-90 wt % having the melting temperature of 160° C. or higher and polyethylene of 10-50 wt % having the melting temperature of 125° C. or higher is used as an inner layer. As described above, if the sheet in the melt-mixing of the composition comprised of the diluent of 80-50 wt % and the resin mixture of 20-50 wt % containing polypropylene of 50-90 wt % having the melting temperature of 160° C. or higher and polyethylene of 10-50 wt % having the melting temperature of 125° C. or higher is used as an inner layer, the polypropylene wax components are extracted so that a film and a roll surface are polluted during the post-processings such as stretching/extraction, etc.

(d) Stretching the 3 layer sheet to be a film is performed.

The stretching may be performed by any stretching methods, such as a tenter type simultaneous stretching or a sequential stretching that performs a primary stretching in a longitudinal direction using a roll and performs a secondary stretching in a transverse direction using a tenter, etc.

Stretching ratios are 4 times or more in a longitudinal direction and in a transverse direction, respectively, and a gross stretching ratio is preferably 25-60 times. When the stretching ratio in one direction is below 4 times, orientation in one direction is not sufficient and at the same time, the balance of physical property between the longitudinal direction and the transverse direction is broken so that puncture strength is deteriorated. Also, when the gross stretching ratio is below 25 times, a local insufficient stretching occurs, and when the gross stretching ratio is above 60 times, the possibility that a breakage occurs during the stretching is high and the shrinkage of the final film is increased.

The stretching temperature varies depending on the composition of the melt-mixing a composition comprised of a diluent of 80-50 wt % and a resin mixture of 20-50 wr % containing polyethylene of 95 wt % or more having a melting temperature of 125° C. or higher, to be surface layers, i.e., a melting point of polyethylene and a concentration and kind of diluent, that are used.

The optimal stretching temperature is preferably selected from a temperature range that a crystal portion of 30-80 wt % of polyethylene and diluent on the surface layer is melted. The extent that the crystal portion is melted depending on the temperature may be obtained from a differential scanning calorimeter (DSC) analysis of a sheet. If the stretching temperature is selected from a temperature range which is lower than the temperature that the crystal portion of 30 wt % in polyethylene and the diluent on the surface layer is melted, the film does not have enough softness so that the stretchability becomes bad, thereby having a high possibility that a breakage occurs at the time of stretching simultaneously with causing a local insufficient stretching. To the contrary, If the stretching temperature is selected from a temperature range higher than the temperature that the crystal portion of 80 wt % of the polyethylene and the diluents on the surface layer is melted, stretching is easy and local insufficient stretching hardly occurs, but a thickness deviation occurs due to partial over-stretching and the molecular orientation is not sufficient, thereby noticeably deteriorating the physical property. The stretching temperature range is lower than the temperature that polypropylene is melted, but is a temperature range that a low-temperature stretching of polypropylene is possible. Through this stretching, polypropylene used in the inner layer is not fractured but is stretched, and at the same time, the polypropylene matrix is formed at the inner layer, thereby increasing the melt fracture temperature and thus improving the thermal stability of the battery.

(e) extracting the diluent from the film is performed.

The sheet which becomes thin through the stretching process, that is, the film, is extracted using an organic solvent and dried. In the present invention, the usable organic solvent is not specifically limited, but any solvent that can extract diluent used in extruding resin, and it is preferable that the solvent is methyl ethyl ketone, methylene chloride, and hexane, etc., that have a high extraction efficiency and is dried rapidly. The extraction method may use all general solvent extraction methods such as an immersion, a solvent spray, and ultrasonic, respectively or combinationally. When extracting, the content of remaining diluent is preferable to be 1 wt % or less. If the content of remaining diluent is above 1 wt %, the physical property is deteriorated and the permeability of the film is reduced.

The amount of remaining diluent is greatly influenced depending on an extraction temperature and a time. The extraction temperature is preferably high in order to increase solubility of diluent and solvent, more preferably, 40° C. or less in consideration of a safety by boiling of the solvent. If the extraction temperature is under a freezing temperature of diluent, the extraction efficiency is noticeably deteriorated, and thus the extraction temperature has to be higher than the freezing temperature of diluent. The extraction time varies depending on the film thickness, but is preferably, 2-5 minutes when manufacturing a microporous film having a thickness of 9-50.

(f) the heat-setting the film is performed.

The dried film is treated by a heat-setting in order to reduce the shrinkage of a film by finally removing remaining tension. Generally, the heat-setting that fixes the film and applies heat thereto is to remove remaining tension by compulsorily holding, stretching or shrink the film to be shrinked. In the present invention, the heat-setting is divided into two processes that firstly stretches the film and secondly shrinks the film.

A high heat-setting temperature is advantageous for lowering the shrinkage and increasing the puncture strength, but when the heat-setting temperature is excessively high, the film is partially melted and thus micropores that are formed in the film are closed, thereby deteriorating the permeability. The heat-setting temperature is preferably selected from a temperature range that the crystal portion of 10-70 wt % of the film is melted. If the heat-setting temperature is selected from a temperature range lower than the temperature that the crystal portion of 10 wt % of the film is melted, the reorientation of molecules in the film is insufficient so that it cannot remove the remaining tension of the film, and if the heat-setting temperature is selected from a temperature range higher than the temperature that the crystal portion of 70 wt % of the film is melted, the micropores are closed by the partial melting so that the permeability is deteriorated.

The stretching and shrinking are respectively performed using a tenter type apparatus. First, the stretching is carried out so that the sheet is stretched by 20 to 50% in a transverse direction, thereby increasing the permeability and improving the tensile strength and the puncture strength. If the film is stretched over 50%, the permeability and the strength are improved, but orientation in the transverse direction is increased such that the shrinkage is increased and the pore size is excessively increased. Second, the shrinking is carried out so that a width of the stretched film is shrinked by 10 to 40%. Thus, the tension and the orientation of resin are relieved due to the shrinking in the transverse direction. At this time, if the film is shrinked above 40%, the permeability and the strength are excessively reduced, and if the film is shrinked below 10%, the tension and the orientation of resin are not relieved, and thus since the shrinkage is increased, it is not possible to secure the stability of the battery.

The heat-setting time may be relatively short when the heat-setting temperature is high, and the heat-setting time may be relatively long when the heat-setting temperature is low. The heat-setting time is preferably 15 seconds to 2 minutes, more preferably, 1 to 2 minutes in a temperature range that the crystal portion of 10-30 wt % of the film is melted and 20 seconds to 1 minute in a temperature range that the crystal portion of 30-70 wt % of the film is melted.

The microporous polyolefin multilayer film according to the present invention and the preparation method thereof will be described in more detail.

The 3 layer microporous film has both surface layers containing polyethylene of 95 wt % or more, and an inner layer containing polypropylene of 50 to 90 wt % and polyethylene of 10 to 50 wt %, wherein a thickness of the film is 9-50 µm, a puncture strength is 0.15N/on or more, a permeability is $1.5 \times 10^{-5}$ Darcy or more, a multiplication of the puncture strength and the permeability is $0.4 \times 10^{-5}$ Darcy·N/µm or more, a shrinkage in a transverse direction at a temperature of 120° C. for 1 hour is 15% or less, and a melt fracture temperature of 160° C. or higher.

If the thickness of the film is below 9 µm, the total strength is weak and thus it is not suitable for the separator for the secondary battery, and if the thickness of the film is above 50 µm the permeability is low and thus it is not suitable for the separator for the secondary battery. It is more preferable that the film has a thickness of 9 to 30 µm.

The puncture strength is preferably 0.15N/µm an or more. If the puncture strength is below 0.15N/µm, the strength is weak and thus it is not suitable for the separator for the secondary battery. The more preferable puncture strength is 0.2N/µm to 0.5N/µm.

The gas permeability of the multilayer separator is $1.5 \times 10^{-5}$ Darcy or more. If the gas permeability is below $1.5 \times 10^{-5}$ Darcy, the permeability is not sufficient and thus it is not suitable for a high-capacity/high-efficiency battery. The gas permeability is more preferably $2.5 \times 10^{-5}$ to $12.0 \times 10^{-5}$ Darcy.

The multiplication of the puncture strength and the permeability of the multilayer separator is $0.4 \times 10^{-5}$ Darcy N/µm or more. If all of the puncture strength and the permeability are low at the same time, the film is weak and the porosity is high, thereby deteriorating the stability of the film. If the multiplication of the puncture strength and the permeability is below $0.4 \times 10^{-5}$ Darcy N/µm, it is not suitable to the separator for a secondary battery.

The pore of the microporous film manufactured by the present invention has an average size of 0.01 µm to 0.2 µm. If the average size is below 0.01 µm, the function of the film as the separator is remarkably deteriorated, and If the average size is above 0.2 µm, the safety and stability of the are deteriorated. The preferable average size of the micropore is 0.01 µm to 0.1 µm.

The shrinkage of the multilayer separator, which is performed at 120° C. for 1 hour in a transverse direction, is less than 15%. Since the separator is fixed in the battery in a longitudinal direction but not fixed in a transverse direction, the shrinkage in the transverse direction is very important. Further, the shrinkage at 120° C. just before the polyethylene is melted is very important. For the high-temperature stability of the battery, it is preferable that the transverse shrinkage of the separator after maintaining under 120° C. for 1 hour is less than 15%, more preferably less than 10%, most preferably less than 5%.

The melt fracture temperature of the microporous film of the present invention is preferably 160° C. or higher. This temperature is determined depending on a melting temperature of the used polypropylene. In general, since the heat-resistance test of the secondary battery is measured at 150° C., it is preferable that the melt fracture temperature is 160° C. or higher.

Further, it is preferable that a sum of each thickness of the surface layers in the microporous film is 50% or more of the total thickness, and a thickness of the inner layer is 1 µm or more. If the sum of each thickness of the surface layers is below 50% of the total thickness, the multiplication of the puncture strength and the permeability is lowered, and if the thickness of the inner layer is below 1 µm, the improvement of the heat resistance is deteriorated.

As described above, the microporous film of the present invention simultaneously has the heat resistance of a film containing polypropylene having excellent heat resistance and the quality stability of a microporous polyethylene film, thereby providing the excellent strength, permeability, thermal stability, and quality stability at the same time.

Advantageous Effects

The microporous polyolefin multilayer film according to the present invention as described above not only has the low shutdown temperature based on polyethylene and the high melt fracture temperature property based on polypropylene, but also has the uniform quality due to the uniform micropores property of the separator prepared using a wet process. Further, the microporous polyolefin multilayer film has the high productivity, high strength/permeability and the low high-temperature shrinkage, making it possible to have remarkable effects when being used in a high-capacity/high-power secondary battery.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

1: frame
2: microporous film
3: tape

BEST MODE

Hereinafter, the present invention will be described in more detail through the embodiments set forth herein but the present invention is not limited thereto.

The molecular weight and the molecular weight distribution of polyethylene and polypropylene were measured by a high-temperature Gel Permeation Chromatography (GPC) manufactured by Polymer Laboratory.

The viscosity of a diluent was measured by Cannon Automatic Viscometer Model CAV-4.

The method of fabricating a sheet and a film from a raw material were as follows.

Method of Fabricating a Film

A diluent and a resin compound of a surface layer were melt-mixed in a twin-screw compounder having $\phi=46$ mm and extruded to have a uniform phase. The melt-mixing temperature was 180-280° C. The resin mixture was fed into a main hoper and the diluent was fed into an extruder using a sidefeeder.

A diluent and a resin mixture of an inner layer were previously melt-mixed in a twin-screw compounder having $\phi=30$ mm and uniformly extruded from a twin-screw compounder having $\phi=15$ mm. The melt-mixing temperature was 180-220° C.

Each composition of the surface layer and the inner layer, which was melted and mixed from the extruder, was extruded through a T-die for co-extrusion, which can fabricate a 3 layer sheet, and then fabricated by a casting roll at 30° C. so as to have a necessary thickness. A desirable layer structure was formed by a feed block located between the extruder and the die, and a thickness of the each layer was controlled by adjusting an extrusion rate of each extruder.

In order to analyze a phenomenon that a crystal portion was melted depending on the temperature of the fabricated sheet, a DSC by Mettler Toledo was used. The analysis conditions were as follows: sample weight was 5 mg; and scanning rate was 10° C./min. In order to separately analyze a melting phenomenon of each layer, separately fabricated each single layer was used.

A simultaneous stretching was performed on the sheet in a tenter type laboratory stretching machine, while changing a stretching ratio and stretching temperature, wherein the stretching temperature was determined in a temperature range that the crystal portion of 30-80 wt % of the layer of polyethylene and diluent layer is melted based on the result of DSC.

The extraction of the diluent was performed by an immersion at a room temperature using methylene chloride, having the extraction time of 5 minutes.

The heat-setting was performed in a continuous tenter type oven while changing the temperature, stretching ratio and shrinking ratio. The heat-setting was performed for 50 seconds, wherein the stretching was performed for 30 seconds and the shrinking was performed for 20 seconds.

The thickness of the respective film layers were measured using a Scanning Electron Microscope (SEM). After cooling the prepared film under liquid nitrogen for 20 seconds and suddenly breaking it, the thickness of the prepared film was measured by observing the cross-section thereof.

For the prepared film, the puncture strength, gas permeability, shrinkage at 120° C. and melt fracture temperature of the prepared film were measured and the results thereof were represented by the Table below.

Method of Measuring Physical Property (1) The puncture strength was measured from the force when a pin having diameter of 1.0 mm fractures a film at a speed of 120 mm/min.

(2) The gas permeability was measured by a porometer (PMI Model CFP-1500-AEL). The present invention used a Darcy's permeability constant. The Darcy's permeability constant was obtained from Equation 1 below and nitrogen was used in the present invention.

$$C=(8FTV)//(\pi D^2(P^2-1)) \qquad \text{Eq.1}$$

where
C=Darcy permeability constant
F=Flow velocity
T=Sample thickness
V=Viscosity of gas (0.185 for $N_2$)
D=Sample diameter
P=Pressure In the present invention, an average value of Darcy's permeability consonant in the range of 100-200 psi was used.

(3) In order to measure the shrinkage at 120° C., after a separator is cut out in 15 cm×15 cm and a length mark of 10 cm was made on at least 5 cut-out separators in a transverse direction, each separator was interposed between papers and then maintained for 60 minutes in an oven that was stabilized at 120° C. Then, the shrinkage is measured as a average of changes of a length of each separator in the transverse direction.

Figure 1:
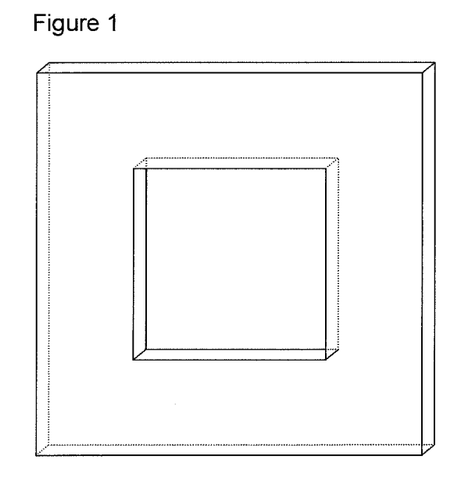
FIG. 1 shows a frame for measuring a melt fracture temperature of a microporous film prepared in one embodiment of the present invention.
Figure 2:
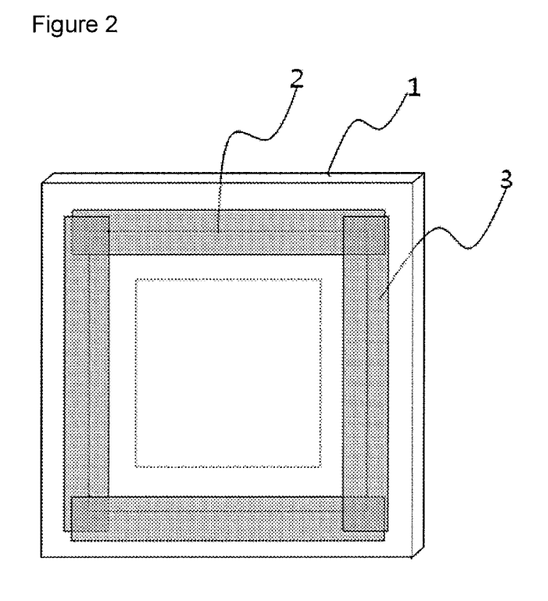
FIG. 2 shows a structure where a microporous film is set to a frame for measuring a melt fracture temperature of a microporous film prepared in one embodiment of the present invention.

Shrinkage (%)=100×(initial length after being kept at 120° C.)/initial length (4) In order to measure the melt fracture temperature of the film, the film (5 cm×5 cm) as shown in FIG. 2 was set to the frame (outer: 7.5 cm×7.5 cm, inner diameter: 2.5 cm×2.5 cm) as shown in FIG. 1 using a polyimide tape and was put in a convention oven that is maintained to a set temperature for 10 minutes, and thereafter, it was observed whether the film is fractured. A highest temperature that the film is not fractured was defined as a melt fracture temperature.

Example 1

In a surface layer 1 and a surface layer 2, polyethylene having a weight-average molecular weight of $3.0 \times 10^5$ and having a melting temperature of 134° C. and paraffin oil having a kinetic viscosity of 95 cSt at 40° C. were used, wherein the contents of the two components were 30 wt % and 70 wt %, respectively.

In an inner layer, polypropylene having a weight-average molecular weight of $5.7 \times 10^5$ and having a melting temperature of 163° C. and polyethylene having a weight-average molecular weight of $3.0 \times 10^5$ and having a melting temperature of 134° C. were used as the resin mixture, wherein the contents of the two components were 50 wt % and 50 wt %, respectively. Also, paraffin oil having a kinetic viscosity of 95 cSt at 40° C. was used as the diluent. The contents of the resin mixture and the diluent were 30 wt % and 70 wt %, respectively.

The sheet was prepared with the compositions of the surface layer 1, the surface layer 2 and the inner layer by the film fabricating method as described above. The prepared 3 layer sheet had a thickness of 1,100/0 and was stretched at 119° C. six times in a longitudinal direction and six times in a transverse direction, totally, thirty-six times.

The heat-setting after the extraction was performed at 125° C. The film was stretched 40% in the transverse direction in the stretching process, and shrinked 20% in the shrinking step comparing with a final width in the stretching step.

The thickness of the final film was 18 μm. The physical property of the obtained separator was represented by Table 1 below.

Example 2

In a surface layer 1 and a surface layer 2, polyethylene having a weight-average molecular weight of $3.0 \times 10^5$ and having a melting temperature of 134° C. and paraffin oil having a kinetic viscosity of 95 cSt at a temperature of 40° C. were used, wherein the contents of the two components were 25 wt % and 75 wt %, respectively.

In an inner layer, polypropylene having a weight-average molecular weight of $5.7 \times 10^5$ and having a melting temperature of 163° C. and polyethylene having a weight-average molecular weight of $3.0 \times 10^5$ and having a melting temperature of 134° C. were used as the resin mixture, wherein the contents of the two components were 70 wt % and 30 wt %, respectively. Also, paraffin oil having a kinetic viscosity of 95 cSt at 40° C. was used as the diluent. The contents of the resin mixture and the diluent were 30 wt % and 70 wt %, respectively.

The sheet was prepared with the composition of the surface layer 1, the surface layer 2 and the inner layer by the film fabricating method as described above. The prepared 3 layer sheet had a thickness of 800 μm.

The prepared sheet was stretched at 117° C. five times in a longitudinal direction and six times in a transverse direction, totally, thirty times. The heat-setting after the extraction was performed at 125° C. The film was stretched 50% in the transverse direction in the stretching step, and shrinked 20% in the shrinking step comparing with a final width in the stretching step. The thickness of the final film was 16 μm. The physical property of the obtained separator was represented by Table 1 below.

Example 3

In a surface layer 1 and a surface layer 2, polyethylene having a weight-average molecular weight of $2.7 \times 10^5$ and having a melting temperature of 130° C. (using propylene as comonomer), and paraffin oil having a kinetic viscosity of 95 cSt at 40° C. were used, wherein the contents of the two components were 30 wt % and 70 wt %, respectively.

In an inner layer, polypropylene having a weight-average molecular weight of $5.7 \times 10^5$ and having a melting temperature of 163° C. and polyethylene having a weight-average molecular weight of $3.0 \times 10^5$ and having a melting temperature of 134° C. were used as the resin mixture, wherein the contents of the two components were 80 wt % and 20 wt %, respectively. Also, paraffin oil having a kinetic viscosity of 95 cSt at 40° C. was used as the diluent. The contents of the resin mixture and the diluent were 50 wt % and 50 wt %, respectively.

The sheet was prepared with the compositions of the surface layer 1, the surface layer 2 and the inner layer by the film fabricating method as described above. The prepared 3 layer sheet had a thickness of 850 μm.

The prepared sheet was stretched at 116° C. six times in a longitudinal direction and six times in a transverse direction, totally, thirty-six times.

The heat-setting after the extraction was performed at 122° C. The film was stretched 50% in the transverse direction in the stretching step, and shrinked 35% in the shrinking step comparing with a final width in the stretching step. The thickness of the final film was 24 μm. The physical property of the obtained separator was represented by Table 1 below.

Example 4

In a surface layer 1 and a surface layer 2, polyethylene having a weight-average molecular weight of $3.0 \times 10^5$ and having a melting temperature of 134° C. and paraffin oil having a kinetic viscosity of 95 cSt at a temperature of 40° C. were used, wherein the contents of the two components were 50 wt % and 50 wt %, respectively.

In an inner layer, polypropylene having a weight-average molecular weight of $5.7 \times 10^5$ and having a melting temperature of 163° C. and polyethylene having a weight-average molecular weight of $3.0 \times 10^5$ and having a melting temperature of 134° C. were used as the resin mixture, wherein the contents of the two components were 60 wt % and 40 wt %, respectively. Also, paraffin oil having a kinetic viscosity of 95 cSt at 40° C. was used as the diluent. The contents of the resin mixture and the diluent were 40 wt % and 60 wt %, respectively.

The sheet was prepared with the compositions of the surface layer 1, the surface layer 2 and the inner layer by the film fabricating method as described above. The prepared 3 layer sheet had a thickness of 550 μm.

The prepared sheet was stretched at a temperature of 121° C. six times in a longitudinal direction and six times in a transverse direction, totally, thirty-six times. The heat-setting process after the extraction was performed at 125° C. The film was stretched 20% in the transverse direction in the stretching step, and shrinked 10% in the shrinking step comparing with a final width in the stretching step. The thickness of the final film was 12 μm. The physical property of the obtained separator was represented by Table 1 below.

Example 5

In a surface layer 1 and a surface layer 2, polyethylene having a weight-average molecular weight of $3.0 \times 10^5$ and having a melting temperature of 134° C. and polymethylpentene having a melting temperature of 245° C. were used as the resin mixture, wherein the contents of the two components were 95 wt % and 5 wt %, respectively. And paraffin oil having a kinetic viscosity of 95 cSt at 40° C. were used as the diluent. The contents of the resin mixture and the diluent were 40 wt % and 60 wt %, respectively.

In an inner layer, polypropylene having a weight-average molecular weight of $5.7 \times 10^5$ and having a melting temperature of 163° C. and polyethylene having a weight-average molecular weight of $3.0 \times 10^5$ and having a melting temperature of 134° C. were used as the resin mixture, wherein the contents of the two components were 60 wt % and 40 wt %, respectively. Also, paraffin oil having a kinetic viscosity of 95 cSt at 40° C. was used as the diluent. The contents of the resin mixture and the diluent were 40 wt % and 60 wt %, respectively.

The sheet was prepared with the composites of the surface layer 1, the surface layer 2 and the inner layer by the film fabricating method as described above. The prepared 3 layer sheet had a thickness of 450 μm.

The prepared sheet was stretched at 121° C. five times in a longitudinal direction and five times in a transverse direction, totally, twenty-five times. The heat-setting after the extraction was performed at 125° C. The film was stretched 30% in the transverse direction in the stretching process, and shrinked 20% in the shrinking step comparing with a final width in the stretching step. The thickness of the final film was 16 μm. The physical property of the obtained separator was represented by Table 1 below.

Comparative Example 1

Polyethylene having a weight-average molecular weight of $3.0 \times 10^5$ and having a melting temperature of 134° C. and paraffin oil having a kinetic viscosity of 95 cSt at 40° C. were used, wherein the contents of the two components were 30 wt % and 70 wt %, respectively.

The diluent and the resin mentioned above were melt-mixed in a twin-screw compounder having $\phi=46$ mm to be a single phase. The melt-mixing temperature was 180-280° C. The resin was fed into a main hoper and the diluent was fed into an extruder using a sidefeeder. The melted and mixed composition was extruded through the T-die for co-extrusion and then fabricated by the casting roll at 30° C. so as to have a necessary thickness. A thickness of the layer was controlled by adjusting an extrusion rate of each extruder. The sheet prepared as a single layer had a thickness of 1,200 μm.

The prepared sheet was stretched at 121° C. six times in a longitudinal direction and six times in a transverse direction, totally, thirty-six times. The heat-setting after the extraction was performed at 125° C. The film was stretched 40% in the transverse direction in the stretching step, and shrinked 5% in the shrinked step comparing with a final width in the stretching step. The thickness of the final film was 20 μm. The physical property of the obtained separator was represented by Table 2 below.

Comparative Example 2

In a surface layer 1 and a surface layer 2, polyethylene having a weight-average molecular weight of $3.0 \times 10^5$ and having a melting temperature of 134° C. and paraffin oil having a kinetic viscosity of 95 cSt at 40° C. were used, wherein the contents of the two components were 60 wt % and 40 wt %, respectively.

In an inner layer, polypropylene having a weight-average molecular weight of $5.7 \times 10^5$ and having a melting temperature of 163° C. was used, and paraffin oil having a kinetic viscosity of 95 cSt at 40° C. was used as the diluent. The contents of the polypropylene and the diluent were 30 wt % and 70 wt %, respectively.

The sheet was prepared with the compositions of the surface layer 1, the surface layer 2 and the inner layer by the film fabricating method as described above. The prepared 3 layer sheet had a thickness of 800 μm.

The prepared sheet was stretched at 121° C. six times in a longitudinal direction and six times in a transverse direction, totally, thirty-six times. The heat-setting after the extraction was performed at 128° C. The film was stretched 40% in the transverse direction in the stretching step, and shrinked 30% in the shrinking step comparing with a final width in the stretching step. The thickness of the final film was 19 μm. The physical property of the obtained separator was represented by Table 2 below.

Comparative Example 3

In a surface layer 1, polyethylene having a weight-average molecular weight of $3.0 \times 10^5$ and having a melting temperature of 134° C. and paraffin oil having a kinetic viscosity of 95 cSt at 40° C. were used, wherein the contents of the two components were 30 wt % and 70 wt %, respectively.

In an inner layer and a surface layer 2, polypropylene having a weight-average molecular weight of $5.7 \times 10^5$ and having a melting temperature of 163° C. and polyethylene having a weight-average molecular weight of $3.0 \times 10^5$ and having a melting temperature of 134° C. were used as the resin mixture, wherein the contents of the two components were 40 wt % and 60 wt %, respectively. Also, paraffin oil having a kinetic viscosity of 95 cSt at of 40° C. was used as the diluent. The contents of the resin mixture and the diluent in the inner layer and the surface layer 2 were 40 wt % and 60 wt %, respectively.

The sheet was prepared with the compositions of the surface layer 1, the surface layer 2 and the inner layer by the film fabricating method as described above. The prepared 3 layer sheet had a thickness of 800 μm.

The prepared sheet was stretched at 122° C. six times in a longitudinal direction and six times in a transverse direction, totally, thirty-six times. The heat-setting after the extraction was performed at 123° C. The film was stretched 50% in the transverse direction in the stretching step, and shrinked 7% in the shrinking step comparing with a final width in the stretching step. The thickness of the final film was 15 μm. The physical property of the obtained separator was represented by Table 2 below. A curling of film was serious in the prepared film, and polypropylene wax powder was deposited at a roller disposed at a rear end of the extractor.

Comparative Example 4

In a surface layer 1 and a surface layer 2, polyethylene having a weight-average molecular weight of $3.0 \times 10^5$ and having a melting temperature of 134° C. and paraffin oil having a kinetic viscosity of 95 cSt at a temperature of 40° C. were used, wherein the contents of the two components were 30 wt % and 70 wt %, respectively.

In an inner layer, polypropylene having a weight-average molecular weight of 5.7×10⁵ and having a melting temperature of 163° C. and polyethylene having a weight-average molecular weight of 3.0×10⁵ and having a melting temperature of 134° C. were used as the resin mixture, wherein the contents of the two components were 60 wt % and 40 wt %, respectively. Also, paraffin oil having a kinetic viscosity of 95 cSt at 40° C. was used as the diluent. The contents of the resin mixture and the diluent in the inner layer were 30 wt % and 70 wt %, respectively.

The sheet was prepared with the compositions of the surface layer 1, the surface layer 2 and the inner layer by the film fabricating method as described above. The prepared 3 layer sheet had a thickness of 500 m.

The prepared sheet was stretched at 121° C. 3.5 times in a longitudinal direction and six times in a transverse direction, totally, twenty-one times. The heat-setting after the extraction was performed at a temperature of 125° C. The film was stretched 15% in the transverse direction in the stretching step, and shrinked 10% in the shrinking step comparing with a final width in the stretching process. The thickness of the final film was 17 μm. The physical property of the obtained separator was represented by Table 2 below.

Comparative Example 5

In a surface layer 1 and a surface layer 2, polyethylene having a weight-average molecular weight of 1.7×10⁵ and having a melting temperature of 124° C. (using butane-1 as comonomer), and paraffin oil having a kinetic viscosity of 95 cSt at 40° C. were used, wherein the contents of the two components were 30 wt % and 70 wt %, respectively.

In an inner layer, polypropylene having a weight-average molecular weight of 3.7×10⁵ and having a melting temperature of 145° C. (using ethylene as cosmonomer) and polyethylene having a weight-average molecular weight of 3.0×10⁵ and having a melting temperature of 134° C. were used as the resin mixture, wherein the contents of the two components were 70 wt % and 30 wt %, respectively. Also, paraffin oil having a kinetic viscosity of 95 cSt at 40° C. was used as the diluent. The contents of the resin mixture and the diluent in the inner layer were 60 wt % and 40 wt %, respectively.

The sheet was prepared with the compositions of the surface layer 1, the surface layer 2 and the inner layer by the film fabricating method as described above. The prepared 3 layer sheet had a thickness of 600 μm.

The prepared sheet was stretched at 121° C. five times in a longitudinal direction and five times in a transverse direction, totally, twenty-five times. The heat-setting after the extraction was performed at 120° C. The sheet was stretched 50% in the transverse direction in the stretching step, and shrinked 45% in the shrinking step comparing with a final width in the stretching step. The thickness of the final film was 23 μm. The physical property of the obtained separator was represented by Table 2 below.

TABLE 1

| Classification | | Example 1 | Example 2 | Example 3 | Example 4 | Example 5 |
| --- | --- | --- | --- | --- | --- | --- |
| Composition of Surface layer 1 (wt %) | | PE (100) | PE (100) | PE (100) | PE (100) | PE/PMP (95/5) |
| Composition of Inner layer (wt %) | | PP/PE (50/50) | PP/PE (70/30) | PP/PE (80/20) | PP/PE (60/40) | PP/PE (60/40) |
| Composition of Surface layer 2 (wt %) | | PE (100) | PE (100) | PE (100) | PE (100) | PE/PMP (95/5) |
| Thickness (μm) | Surface layer 1 | 8 | 5 | 10 | 4 | 6 |
| | Inner layer | 2 | 6 | 4 | 4 | 4 |
| | Surface layer 2 | 8 | 5 | 10 | 4 | 6 |
| Ratio of Inner layer (%) | | 11 | 40 | 16 | 33 | 25 |
| Puncture strength (N/μm) | | 0.27 | 0.18 | 0.26 | 0.33 | 0.29 |
| Permeability (10⁻⁵ Darcy) | | 2.3 | 2.5 | 1.7 | 1.5 | 1.8 |
| Puncture strength × Permeability (10⁻⁵ Darcy N/μm) | | 0.62 | 0.45 | 0.44 | 0.50 | 0.52 |
| Shrinkage for 1 hour at 120° C. (%) | | 14 | 10 | 4 | 11 | 5 |
| Melt fracture temperature (° C.) | | 161 | 165 | 168 | 165 | 165 |

PE: Polyethylene,
PP: Polypropylene,
PMP: Polymethylpentene

TABLE 2

| Classification | | Comparative Example 1 | Comparative Example 2 | Comparative Example 3 | Comparative Example 4 | Comparative Example 5 |
| --- | --- | --- | --- | --- | --- | --- |
| Composition of Surface layer 1 (wt %) | | PE (100) | PE (100) | PE (100) | PE (100) | PE (100) |
| Composition of Inner layer (wt %) | | — | PP (100) | PP/PE (40/60) | PP/PE (60/40) | PP/PE (70/30) |
| Composition of Surface layer 2 (wt %) | | — | PP (100) | | PE (100) | PE (100) |
| Thickness (μm) | Surface layer 1 | 20 | 8 | 5 | 8 | 4 |
| | Inner layer | — | 3 | 10 | 0.8 | 15 |
| | Surface layer 2 | — | 8 | | 8 | 4 |

TABLE 2-continued

| Classification | Comparative Example 1 | Comparative Example 2 | Comparative Example 3 | Comparative Example 4 | Comparative Example 5 |
|---|---|---|---|---|---|
| Rate of Inner layer (%) | — | 16 | — | 5 | 65 |
| Puncture strength (N/μm) | 0.25 | 0.38 | 0.15 | 0.13 | 0.15 |
| Permeability ($10^{-5}$ Darcy) | 2.7 | — | 4.0 | 1.2 | 0.8 |
| Puncture strength × Permeability ($10^{-5}$ Darcy N/μm) | 0.68 | — | 0.60 | 0.16 | 0.12 |
| Shrinkage for 1 hour at 120° C. (%) | 18 | 6 | 22 | 19 | 1 |
| Melt fracture temperature (° C.) | 135 | 171 | 154 | 153 | 150 |

PE: Polyethylene,
PP: Polypropylene,

The present application contains subject matter related to Korean Patent Application No. 2008-0051989, filed in the Korean Intellectual Property Office on Jun. 3, 2008, the entire contents of which is incorporated herein by reference.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

INDUSTRIAL APPLICABILITY

According to the present invention, the microporous polyolefin multilayer film not only has the low shutdown temperature based on polyethylene and the high melt fracture temperature based on polypropylene, but also has the uniform quality due to the uniform micropores of the separator prepared using a wet process. Further, the microporous polyolefin multilayer film has the high productivity, high strength/permeability and the low high-temperature shrinkage, making it possible to have remarkable effects when being used in a high-capacity/high-power secondary battery.

The invention claimed is:

1. A microporous polyolefin multilayer film comprising an inner layer made of a resin mixture containing polypropylene of 50-90 wt % having a melting temperature of 160° C. or higher and polyethylene of 10-50 wt % having a melting temperature of 125° C. to 135° C. and a surface layer formed on both surfaces of the inner layer, made of a resin mixture containing polyethylene of 95% or more having a melting temperature of 125° C. or higher,
   wherein a thickness of the film is 9-50 μm, a puncture strength is 0.15N/μm or more, a permeability is 1.5× $10^{-5}$ Darcy or more, a multiplication of the puncture strength and the permeability is 0.4×$10^{-5}$ Darcy·N/μm or more, a shrinkage in a transverse direction at 120° C. for 1 hour is 15% or less, and a melt fracture temperature of 160° C. or higher.

2. A microporous polyolefin multilayer film according to claim 1, wherein the thickness of the film is 9-30 μm, the puncture strength is 0.2N/μm or more, the permeability is 2.5×$10^{-5}$ to 12.0×$10^{-5}$ Darcy, and the shrinkage in a transverse direction at 120° C. for 1 hour is 10% or less.

3. A microporous polyolefin multilayer film prepared by the method according to claim 1, wherein a surface layer is made of polyethylene having a melting temperature of 125° C. or higher, and
   wherein the thickness of the film is 9-30 μm, the puncture strength is 0.2N/μm or more, the permeability is 2.5× $10^{-5}$ to 12.0×$10^{-5}$ Darcy, and the shrinkage in a transverse direction at 120° C. for 1 hour is 10% or less.

4. A microporous polyolefin multilayer film prepared by the method according to claim 1, wherein a sum of each thickness of the surface layers is 50% or more of an total thickness, and a thickness of the inner layer is or more, and
   wherein the thickness of the film is 9-30 μm, the puncture strength is 0.2 N/μm or more the permeability is 2.5× $10^{-5}$ to 12.0×$10^{-5}$ Darcy, and the shrinkage in a transverse direction at 120° C. for 1 hour is 10% or less.

* * * * *